March 3, 1964 M. J. GROSS 3,122,867
FIXTURE FOR HOLDING WORKPIECES
Filed July 18, 1962 4 Sheets-Sheet 1
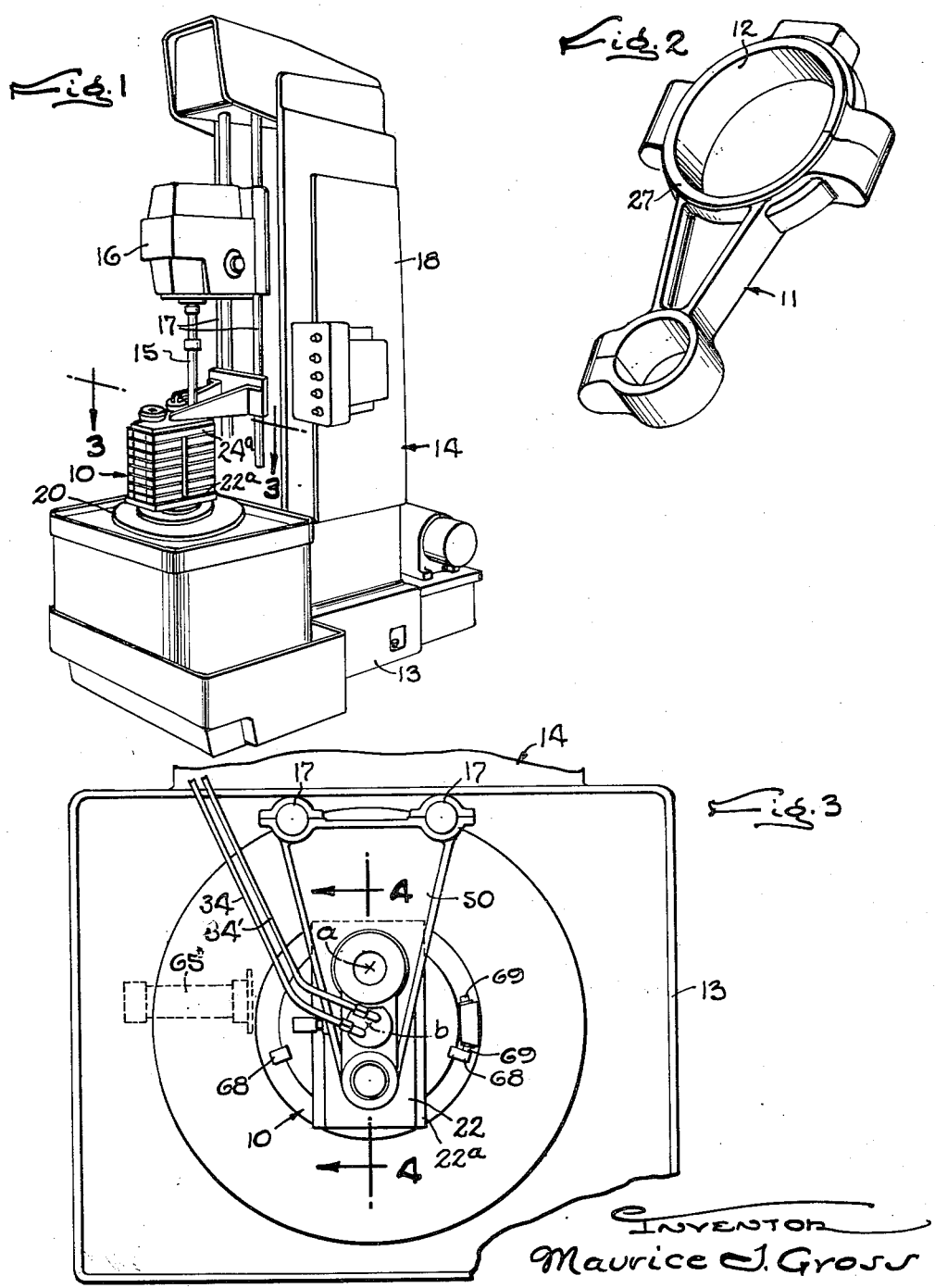
INVENTOR
Maurice J. Gross
by Wolfe, Hubbard, Voit & Osann
ATTORNEYS

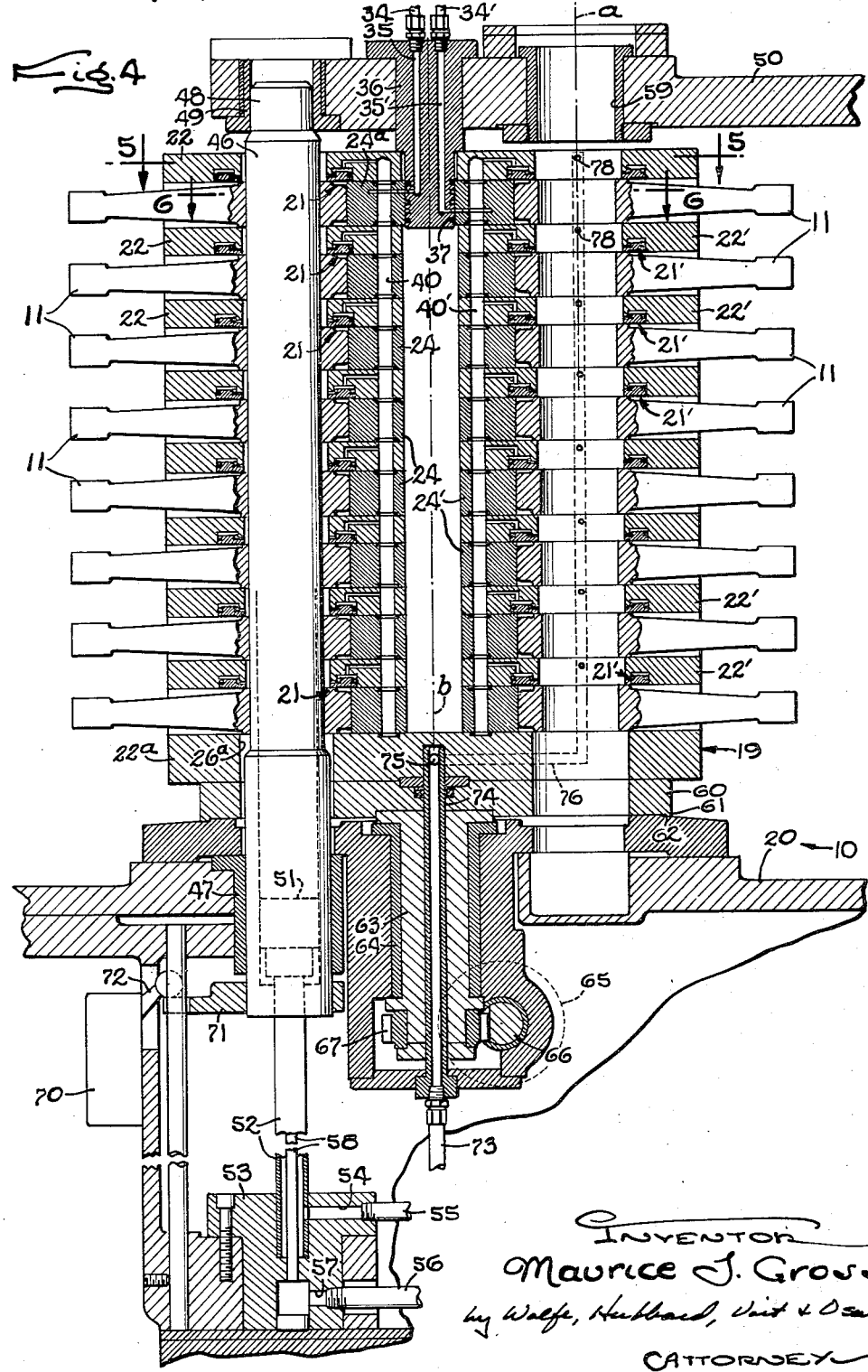

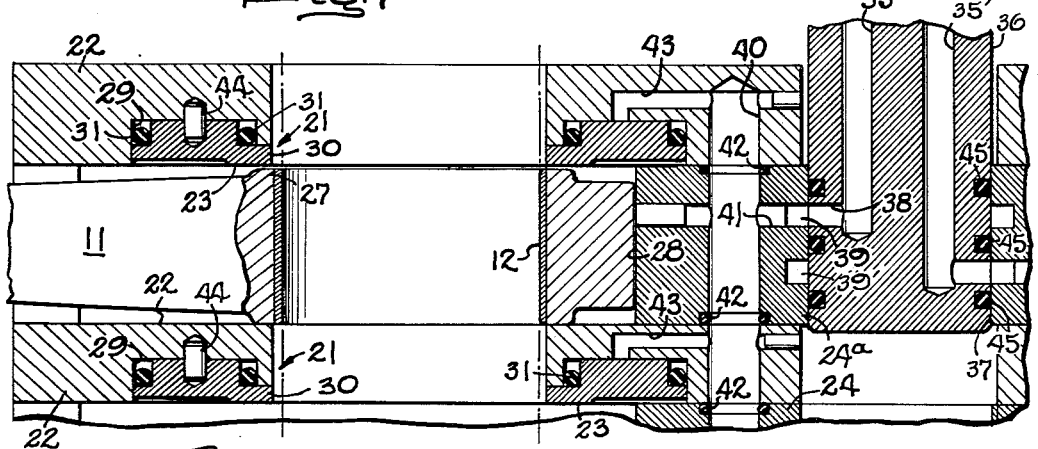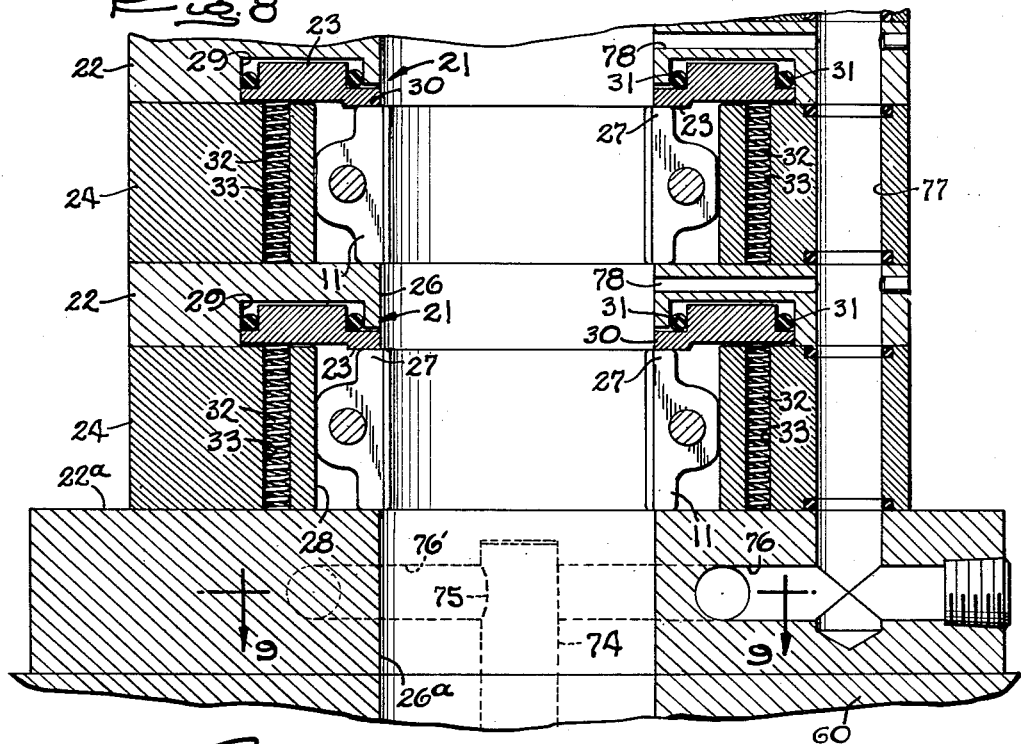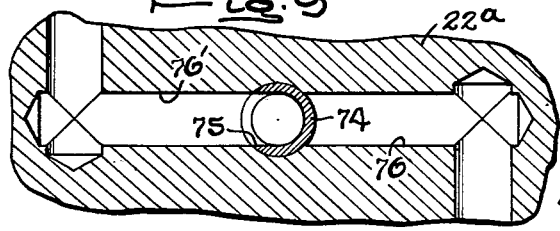

United States Patent Office 3,122,867
Patented Mar. 3, 1964

3,122,867
FIXTURE FOR HOLDING WORKPIECES
Maurice J. Gross, Rockford, Ill., assignor to Barnes Drill Co., Rockford, Ill., a corporation of Illinois
Filed July 18, 1962, Ser. No. 210,680
8 Claims. (Cl. 51—227)

The present invention relates to a fixture for holding workpieces while the latter are being operated upon by a machien tool and, more particularly, to a fixture for holding a workpiece with a bore which is to be machined as by honing.

The principal object of the invention is to provide a new and improved fixture which is capable of holding a plurality of workpieces with their bores precisely alined so that all may be operated upon at the same time.

A more detailed object is to achieve the precise location of the workpieces by supporting and clamping each workpiece in the fixture independently of the others.

The invention also resides in the novel means for clamping each of the workpieces.

Other objects and advantages of the invention will become apparent from the following detailed description taken in connection with the accompanying drawings, in which FIGURE 1 is a perspective view of a honing machine utilizing the novel fixture embodying the present invention.

FIG. 2 is a perspective view of a workpiece adapted to be held in the fixture.

FIG. 3 is an enlarged fragmentary sectional view taken along the line 3—3 in FIG. 1.

FIG. 4 is an enlarged fragmentary sectional view taken along the line 4—4 in FIG. 3.

FIG. 7 is an enlarged fragmentary sectional view taken along the line 7—7 in FIG. 5.

FIG. 8 is an enlarged fragmentary sectional view taken along the line 8—8 in FIG. 5.

FIG. 9 is a fragmentary sectional view taken along the line 9—9 in FIG. 8.

Figure 5:
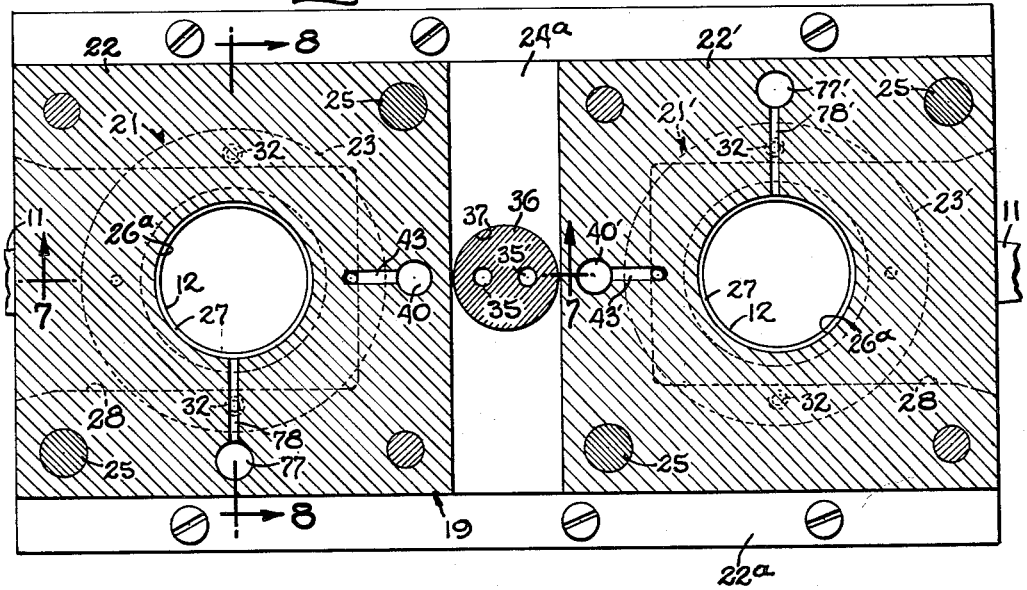
FIG. 5 is an enlarged fragmentary sectional view taken along the line 5—5 in FIG. 4.

For purposes of illustration, the invention is shown in the drawings as embodied in a fixture 10 for holding a workpiece such as a connecting rod 11 while the bore 12 of the latter is honed. The fixture is adapted to be mounted on the base 13 of a suitable honing machine 14 with the bore of the connecting rod coaxial with the spindle 15 of the machine. As is usual in such machines, the spindle is driven by a motor in a head 16 which slides up and down on vertical guides 17 supported by a column 18 upstanding from the base 13. The head is reciprocated on the guides while the spindle is rotated so that the bore of the connecting rod is honed by the tool (not shown) supported on the lower end of the spindle.

The present invention contemplates the provision of a novel fixture 10 which is capable of supporting a plurality of workpieces 11 one above the other with the bores 12 in vertical alinement but which supports and clamps each workpiece independently so that all of the workpieces may be accurately honed at the same time. Preferably, the fixture is constructed to hold two sets of workpieces with one set held with their bores along the spindle axis $a$ (FIG. 4) and the others in an inactive position and the fixture is arranged to be indexed to bring the second set into the active position along the spindle axis after the honing of the first set has been completed. In this way, the fixture may be loaded and unloaded while the machine 14 is honing the workpieces which are in the active position.

To achieve the foregoing, the fixture 10 comprises a body 19 (FIG. 4) rotatable on a stationary base 20 about a vertical axis $b$ laterally offset from the axis $a$ of the spindle 15 and supporting two stacks of clamps 21 and 21' (FIG. 4) diametrically disposed on opposite sides of the axis $b$. In the position illustrated in FIG. 4, the clamps 21 are in the inactive or loading position and the clamps 21' are in the active position along the spindle axis. Each of the clamps 21 is composed of spaced jaws 22 and 23 (FIGS. 7 and 8) which present opposed clamping surfaces for gripping opposite sides of the workpiece and the jaws 22 are rigid with the body 19 while the jaws 23 are movable, each independently of the others, toward and away from the corresponding fixed jaws. The clamps 21' are identical in construction and the corresponding parts are identified by the same but primed reference characters.

Figure 6:
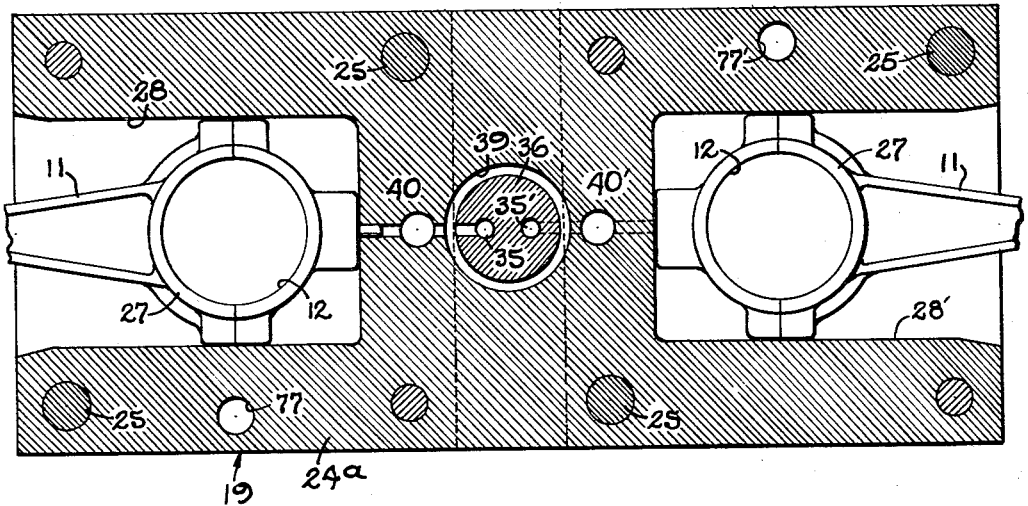
FIG. 6 is an enlarged sectional view taken along the line 6—6 in FIG. 4.

In the present instance, the fixed jaws 22 are the lower jaws of the clamps 21 and, except for the lowermost one, are formed by vertically spaced blocks, the fixed jaw of the bottom clamp being part of a horizontal plate 22$^a$ as shown in FIG. 4. The blocks are held apart by spacers 24 and bolts 25 (FIGS. 6 and 8) projecting through the blocks, the spacers and the plate 22$^a$ securing these parts together in a rigid, unitary assembly which constitutes the major portion of the body 19. The blocks 22 and the plate 22$^a$ are formed with alined holes 26 and 26$^a$ slightly larger than the bores 12 of the connecting rods 11 but small enough so that the outer circumferential portion of the bosses 27 surrounding the bores 12 rest on the fixed jaws 22. The spacers 24, which project out to the ends of the blocks 22 (see FIG. 6), are thicker than the connecting rods to leave a small space between the boss 27 and the block on top and are formed with slots or recesses 28 loosely receiving the rods. Thus, the blocks 22 and the spacers 24 define individual slots into which the connecting rods are inserted preparatory to clamping. As shown in FIGS. 5 and 6, the top spacer 24$^a$ extends all the way across the fixture 10 to form parts of both the corresponding clamp 21 and the clamp 21' while separate blocks 22 and 22' and spacers 24 and 24' are used for the two sets of clamps below the spacer 24$^a$.

The movable jaws 23 are rings (FIGS. 7 and 8) slidably received in annular grooves 29 formed in the undersides of the blocks 22 and each ring includes an inner peripheral flange 30 which engages the upper boss 27 on the connecting rod. The upper portion of each ring is reduced in diameter and the spaces between this portion and the walls of the associated groove 29 are sealed by O-rings 31. Thus, the rings 23 constitute annular pistons sliding in the grooves 29 and advantage is taken of this to utilize a pressure fluid for moving the rings or jaws 23 into clamping engagement with the connecting rods. Compression springs 32 disposed in bores 33 in the spacers 24 act between the blocks 22 and the rings 23 to move the latter upwardly when the pressure in the grooves 29 is relieved and thereby unclamp the work.

To provide the clamping force, a suitable fluid which preferably is a liquid is admitted under pressure through a supply line 34 (FIG. 4) communicating with a passage 35 in a stationary trunnion 36, the latter extending along the axis $b$ and projecting into a central bore 37 in the top spacer 24$^a$ whereby the body turns about the trunnion. The passage 35 is connected by a branch 38 (FIG. 7) to a peripheral groove 39 in the uppermost spacer 24$^a$ and this groove, in turn, is connected to a manifold passage 40 by another branch passage 41 so that the manifold passage 40 is in constant communication with the passage 35 in all angular postions of the body 19.

The manifold passage 40 extends through the blocks 22 and the spacers 24, being sealed at each joint by O- rings 42, and is connected to the upper ends of the various grooves 29 by small passages 43 which thereby complete the connection from the pressure fluid supply line 34 to the backs of the movable jaws 23. The latter are guided and held against turning in the grooves 29 by small pins 44 projecting into the blocks 22 and the blocks of the movable jaws. In order that the clamps 21 and the clamps 21′ may be operated independently of each other, a separate supply line 34′ leads through a second passage 35′ and groove 39′ in the upper block 22 to a similar system of passages for the movable jaws 23′ of the clamps 21′. Each supply line 34 and 34′ is provided with separate control valving (not shown) to permit the independent admission and exhausting of pressure fluid to the two sets of clamps. The grooves 39 and 39′ are sealed by O-rings 45 seated in the periphery of the trunnion 36.

Before the connecting rods 11 are clamped but after they have been placed between the jaws 22 and 23, they are located so that their bores 12 are accurately alined. For this purpose, an elongated generally cylindrical locator 46, which normally is disposed beneath the plate 22ª, is projected up through the hole 26ª in the plate and the bores 12. The locator slides in a bushing 47 keyed in the base 20 of the fixture 10 and, when it is in the projected position shown in FIG. 4, the reduced upper end portion 48 of the locator extends into a sleeve 49 in a horizontal bracket 50 which is rigid with the column 18 and supports the trunnion 36. As the locator 46 moves up through the bores 12, it picks up successive ones of the connecting rods 11 and then, when the end 48 projects into the sleeve 49, the locator and hence the rods are accurately located. At this time, pressure fluid is admitted to the grooves 29 to clamp the rods and then the locator is retracted.

To raise and lower the locator 46, the latter is formed as a hollow cylinder and receives a stationary piston 51 whose rod 52 also is hollow and projects down into a block 53 where, through a passage 54 in the block, it communicates with a conduit 55. A second conduit 56 is connected by a passage 57 in the block to a pipe 58 which is disposed inside the piston rod 52 and projects through the piston. Pressure fluid is admitted to the interior of the locator 46 above the piston through the conduit 56 and the pipe 58 and this raises the locator while the latter is lowered by admitting pressure fluid through the conduit 55 and the rod 52 to the space below the piston.

When the connecting rods 11 have been clamped and the locator 46 retracted, the body 19 is turned through 180 degrees about the axis b to bring the bores 12 in alinement with the spindle axis a and a suitable honing tool guide 59 which is a sleeve seated in the bracket 50. The body 19 is supported for such turning by the trunnion 36 and a bearing plate 60 secured to the underside of the plate 22ª and formed with a downturned peripheral flange 61 mating with a complemental annular shoulder 62 on the base 20, the flange and the shoulder being coaxial with the axis b. Rigid with and depending from the center of the bearing plate 60 is a shaft 63 which also is coaxial with the axis b and which turns in a bearing sleeve 64 pressed into the base 20.

To turn the body 19 about the axis b, a horizontally disposed hydraulic actuator 65 (FIGS. 3 and 4) of the piston and cylinder type is mounted on the fixture base 20 and the piston rod 66 of the actuator is formed with a rack which meshes with a pinion 67 carried on the lower end of the shaft 63 whereby the shaft and hence the body 19 are turned back and forth about the axis b as the piston rod 66 is projected and retracted. Movement of the body in each direction is limited by lugs 68 (FIG. 3) which are carried by the plate 60 and abut against stationary stops 69 on the base 20 to alternate the positions of the clamps 21 and 21′ in the active and inactive positions. Turning of the body 19 except when the locator 46 is in the retracted position is prevented by an interlock device 70 (FIG. 4) which is in the control (not shown) of the actuator 65 and which is activated by an abutment 71 carried by the locator and engaging a lever 72 of the interlock device.

If desired, provision may be made to provide a coolant to the workpieces 11 which are held at any given time in the active or honing position. For this purpose, a conduit 73 (FIG. 4) connected to a suitable supply of coolant (not shown) communicates with a stationary tube 74 extending along the axis of the shaft 63. An orifice 75 at the upper end of the tube opens into one of two passages 76 and 76′ (FIG. 9) depending on the position of the body 19. The passage 76 is connected to a manifold passage 77 (FIGS. 5 and 8) which extends through the blocks 22 and spacers 24 and which, through lateral branch passages 78 in the spacers, empties into the spaces between the connecting rods 11 held by the clamps 21. Similarly, the passage 76′ provides coolant to the rods held by the clamps 21′ through a manifold passage 77′ and branch passages 78′. The orifice 75 in the tube 74 is positioned to supply coolant only to the manifold passage associated with the clamps which are in the active position.

It will be observed that a fixture 10 constructed in accordance with the invention holds a plurality of workpieces 11 while all simultaneously are being operated upon as by a honing machine. Moreover, each workpiece is supported and clamped independently of the others and hence it may be located accurately relative to the axis a of the spindle 15 of the tool. By constructing the body 19 for indexing and by providing two sets of clamps 21 21′, one set of workpieces may be loaded into the fixture while another set is being machined.

I claim as my invention:

1. A fixture for holding a plurality of workpieces comprising, a base, a body mounted on said base to turn about a longitudinal axis, a first set of members rigid with and projecting radially from said body on one side of said axis, said members being spaced apart longitudinally of said body to define slots for receiving workpieces and one side of each member constituting a clamping surface, the other side of each of said members having a recess opposing the clamping surface of the adjacent member, a first set of pistons, one slidable in each of said recesses, second and similar sets of members and pistons on the opposite side of said axis, means operable to admit a pressure fluid to the recesses in a selected set of members thereby to urge the corresponding pistons toward the clamping surface of the adjacent member and clamp the workpieces to said body, and mechanism operable to turn said body about said axis whereby the angular positions of said two sets of members may be interchanged.

2. A fixture for holding a plurality of workpieces comprising a base, a body mounted on said base to turn about a longitudinal axis and having a first set of radially opening slots spaced apart longitudinally of the body on one side of the axis thereof and overlying each other, each of said slots being defined in part by a clamping surface facing longitudinally of the body, a first set of members, one for each of said slots and each opposing and spaced from the corresponding clamping surface, said body having a second and similar set of slots disposed on the opposite side of said axis, a second set of members similarly associated with said second set of slots, means operable to move the members of a selected set toward the associated clamping surfaces thereby to clamp workpieces received in the corresponding slots, and mechanism operable to turn said body about said axis whereby the angular positions of said two sets of slots may be interchanged.

3. A fixture for holding a plurality of workpieces having bores to be operated upon, said fixture comprising, a body, a plurality of members rigid with and projecting laterally from said body and having alined holes, said members being spaced apart to define slots for receiving the workpieces with the bores thereof alined with said holes, one side of each of said members constituting a clamping surface and the other side being formed with an annular groove surounding the hole in the member, a plurality of rings, one received in each of said grooves, means sealing said grooves around said rings while permitting the rings to slide toward and away from the clamping surface of the adjacent one of said members, means adapted to connect said grooves to a source of pressure fluid and selectively to admit and exhaust the fluid in the grooves thereby to clamp and unclamp workpieces received in said slots, and springs acting on said rings in opposition to said pressure fluid to move the rings away from the workpieces when the pressure fluid is exhausted from said grooves.

4. A fixture for holding a plurality of workpieces having bores to be operated upon, said fixture comprising, a body, a plurality of members rigid with and projecting laterally from said body and having alined holes, said members being spaced apart to define slots for receiving the workpieces with the bores thereof alined with said holes, one side of each of said members constituting a clamping surface and the other side being formed with an annular groove surrounding the hole in the member, a plurality of rings, one received in each of said grooves, means sealing said grooves around said rings while permitting the rings to slide toward and away from the clamping surface of the adjacent one of said members, and means selectively operable to admit a pressure fluid into said grooves thereby to urge the rings toward the opposing clamping surface and clamp the workpieces received in said slots.

5. A fixture for holding a plurality of workpieces having bores to be operated upon, said fixture comprising, a body, a plurality of members rigid with and projecting laterally from said body and having alined holes, said members being spaced apart to define slots for receiving the workpieces with the bores thereof alined with said holes, one side of each of said members constituting a clamping surface and the other side being formed with an annular groove surrounding the hole in the member, a plurality of rings, one received in each of said grooves and slidable toward and away from the clamping surface of the adjacent one of said members, and means operable to urge said rings toward the opposing clamping surfaces thereby to clamp the workpieces received in said slots.

6. A fixture for holding a plurality of workpieces comprising, a body, a plurality of members rigid with and projecting laterally from said body, said members being spaced apart to define slots for receiving workpieces and one side of each member constituting a clamping surface, the other side of each of said members having a recess opposing the clamping surface of the adjacent member, a plurality of pistons, one slidable in each of said recesses, and means selectively operable to admit a pressure fluid to said recesses thereby to urge said pistons toward the opposed one of said members and clamp the workpieces to said body.

7. A fixture for holding a plurality of workpieces comprising, a body having a plurality of laterally opening slots spaced apart longitudinally of the body and overlying each other, each of said slots being defined in part by a clamping surface facing longitudinally of the body, a plurality of members, one for each of said slots and each opposing and spaced from the corresponding clamping surface, means supporting said members on said body for movement independently of each other toward and away from the corresponding clamping surface, and fluid pressure operated mechanism selectively operable on said members to move the members simultaneously but individually toward said surfaces thereby to clamp workpieces received in said slots.

8. A fixture for holding a plurality of workpieces comprising, a body having a plurality of laterally opening slots spaced apart longitudinally of the body and overlying each other, each of said slots being defined in part by a clamping surface facing longitudinally of the body, a plurality of members, one for each of said slots and each opposing and spaced from the corresponding clamping surface, means supporting said members on said body for movement independently of each other toward and away from the corresponding clamping surface, and mechanism selectively operable to move said members simultaneously but individually toward said surfaces thereby to clamp workpieces received in said slots.

References Cited in the file of this patent

UNITED STATES PATENTS

| | | |
|---|---|---|
| 1,810,214 | Johnson | June 16, 1931 |
| 1,873,819 | Butterworth | Aug. 23, 1932 |
| 1,905,102 | Johnson | Apr. 25, 1933 |
| 2,229,477 | Shannon | Jan. 21, 1941 |
| 2,520,249 | La Pointe | Aug. 29, 1950 |
| 2,615,413 | Adams et al. | Oct. 28, 1952 |
| 2,829,470 | Johnson | Apr. 8, 1958 |
| 2,844,053 | Wagner et al. | July 22, 1958 |
| 2,846,379 | Chambers et al. | Aug. 5, 1958 |
| 3,087,281 | Greening et al. | Apr. 30, 1963 |